(12) United States Patent
Akashi

(10) Patent No.: US 12,407,758 B2
(45) Date of Patent: Sep. 2, 2025

(54) METHOD, INFORMATION PROCESSING APPARATUS, AND STORAGE MEDIUM

(71) Applicant: CANON KABUSHIKI KAISHA, Tokyo (JP)

(72) Inventor: Masamichi Akashi, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/709,216

(22) Filed: Mar. 30, 2022

(65) Prior Publication Data
US 2022/0329658 A1    Oct. 13, 2022

(30) Foreign Application Priority Data
Apr. 7, 2021    (JP) ................ 2021-065121

(51) Int. Cl.
*H04L 67/14*    (2022.01)
*H04N 1/00*    (2006.01)

(52) U.S. Cl.
CPC ......... *H04L 67/14* (2013.01); *H04N 1/00217* (2013.01); *H04N 1/00344* (2013.01)

(58) Field of Classification Search
None
See application file for complete search history.

(56) References Cited

U.S. PATENT DOCUMENTS

| | | | |
|---|---|---|---|
| 2003/0231345 A1* | 12/2003 | Azami | G06K 15/02 358/1.18 |
| 2007/0206212 A1* | 9/2007 | Ohno | G06F 3/1218 358/1.14 |
| 2012/0140251 A1* | 6/2012 | Grodsky | H04N 1/32144 358/1.9 |
| 2013/0145420 A1* | 6/2013 | Ting | H04L 63/08 726/1 |
| 2014/0075010 A1* | 3/2014 | Gupta | H04L 65/40 709/224 |
| 2015/0220289 A1* | 8/2015 | Teruya | G06K 15/1801 358/1.13 |
| 2018/0375735 A1* | 12/2018 | Hale | H04L 45/00 |
| 2022/0076214 A1* | 3/2022 | Shiraishi | H04N 1/00427 |

FOREIGN PATENT DOCUMENTS

JP    2020091370 A  *  6/2020

* cited by examiner

*Primary Examiner* — Tonia L Dollinger
*Assistant Examiner* — Ishrat Rashid
(74) *Attorney, Agent, or Firm* — Canon U.S.A., Inc. IP Division

(57) ABSTRACT

A method of collecting operation information from an apparatus on a network includes searching for an apparatus on the network, in response to finding an image processing apparatus and a control apparatus that is connected to the image processing apparatus and transmits print data to the image processing apparatus in the searching, collecting operation information from one of the image processing apparatus and the control apparatus, and storing the collected operation information in a predetermined storage area.

16 Claims, 16 Drawing Sheets

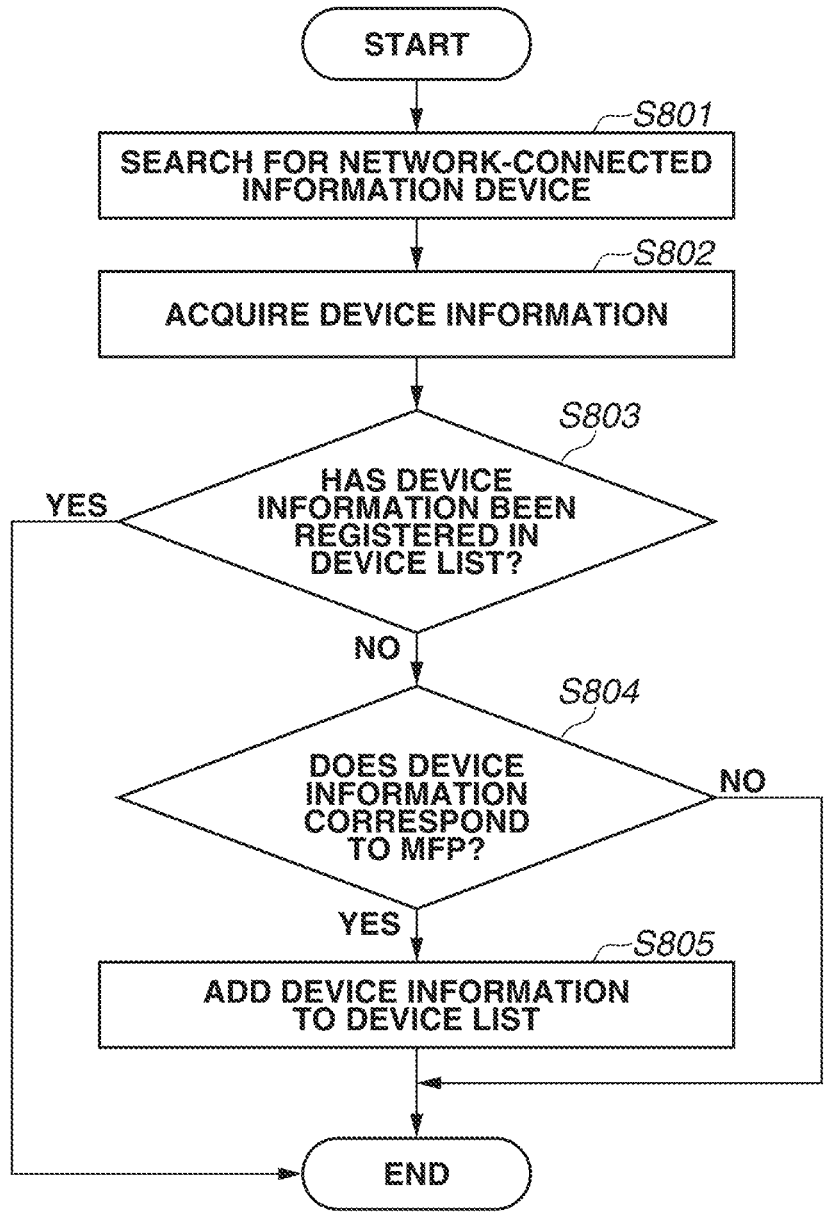

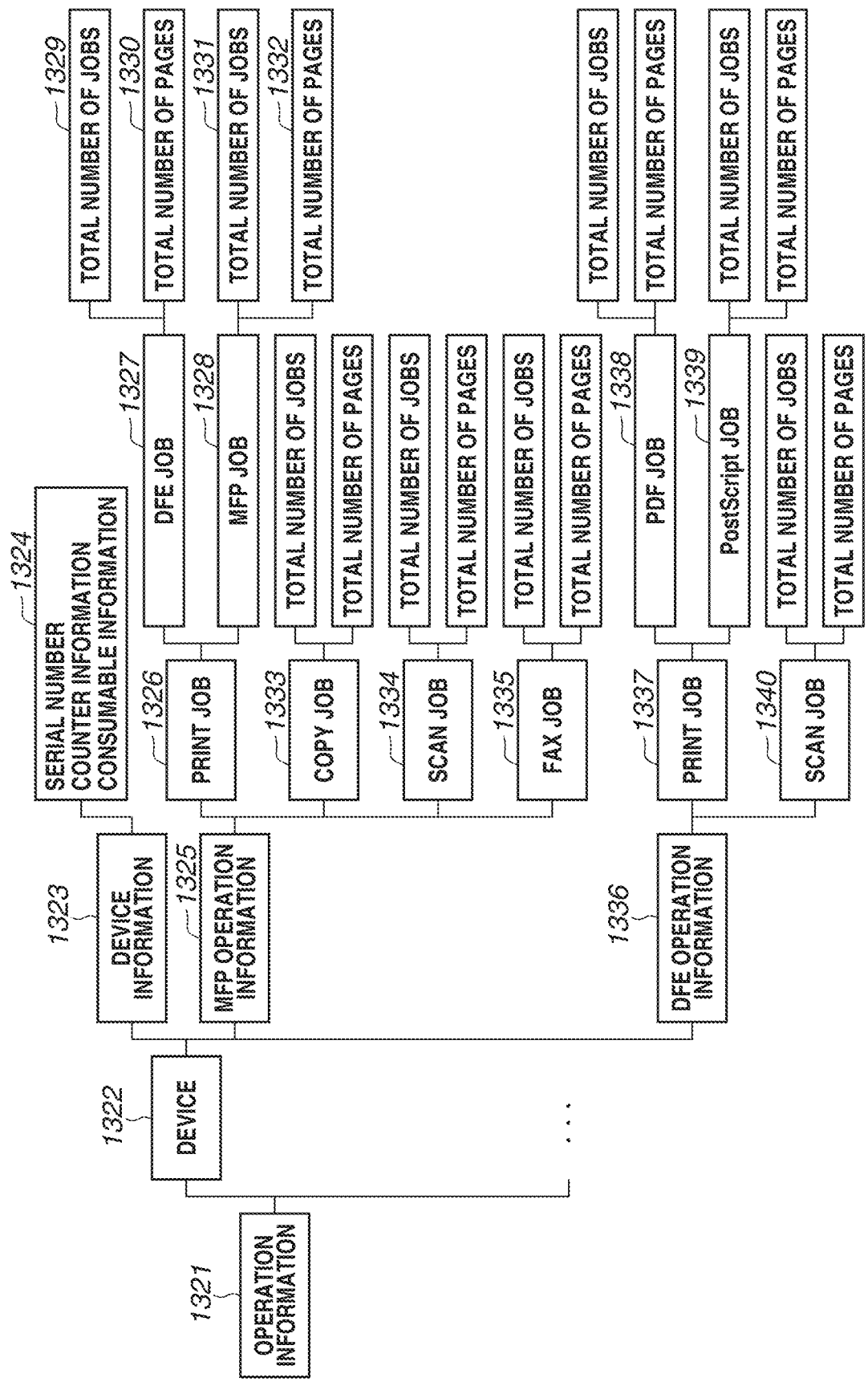

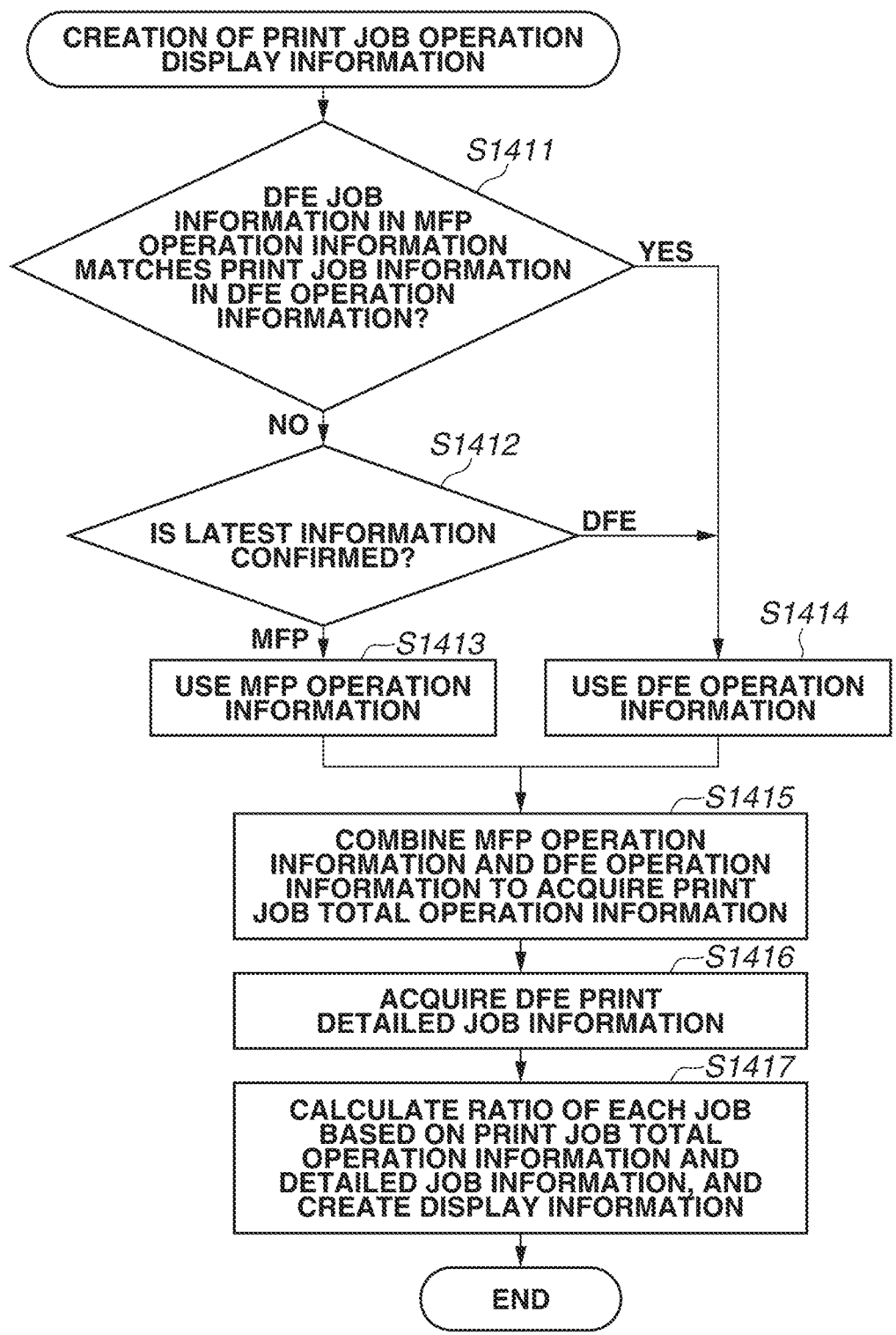

023
METHOD, INFORMATION PROCESSING APPARATUS, AND STORAGE MEDIUM

BACKGROUND

Field of the Disclosure

The present disclosure relates to operation management of a system in which an information processing apparatus and a control apparatus that is connected to the image processing apparatus and transmits print data to the image processing apparatus are connected to the same network.

Description of the Related Art

In recent years, most of image processing apparatuses such as printers, scanners, facsimiles (FAX), and multifunction printers (MFP) compositely including these functions have included a network communication function. A MFP including the communication function communicates with servers and personal computers (PC) on a network, to carry out functions such as scan data transmission from the MFP to the PCs.

On the other hand, professional-use products for printing companies and design offices are required to perform more advanced print controls than products for general offices, for example, in terms of image processing and scheduling of print jobs. Such advanced print controls are performable with a control apparatus called a digital front end controller (DFE) connected to the MFP. Printing companies and design offices often uses a DFE connected to an MFP.

Although a DFE and an MFP include device information in their own control units, there is demand to collectively manage device information that is currently managed by the control units of the DFE and the MFP in a distributed way. Japanese Patent Application Laid-Open No. 2020-091370 discusses a technique in which a DFE connected to an MFP in a network acquires device information from the MFP in response to a request from a device management apparatus, and merges the acquired device information with own device information, thereby responding to the request. That technique allows device information managed by a DFE and an MFP in a distributed way to be collectively managed.

SUMMARY

According to embodiments of the present disclosure, a method of collecting operation information from an apparatus on a network includes searching for an apparatus on the network, in response to finding an image processing apparatus and a control apparatus that is connected to the image processing apparatus and transmits print data to the image processing apparatus in the searching, collecting operation information from one of the image processing apparatus and the control apparatus, and storing the collected operation information in a predetermined storage area.

Further features of the present disclosure will become apparent from the following description of exemplary embodiments with reference to the attached drawings.

BRIEF DESCRIPTION OF THE DRAWINGS

FIG. 8 is a flowchart illustrating an example of processing performed by an information collection PC according to the first exemplary embodiment.

FIG. 13C is a diagram illustrating a data structure of the operation information according to the third exemplary embodiment.

FIG. 14B is a flowchart illustrating an example of processing performed by the device operation management apparatus according to the third exemplary embodiment.

DESCRIPTION OF THE EMBODIMENTS

There is a case where, with a digital front end controller (DFE) connected to a multifunction printer (MFP), both the MFP and the DFE are connected to a network. In that case, operation information is collected from both the MFP and the DFE, and is transmitted to a management apparatus. That leads to management of the MFP and the DFE separately by the management apparatus. In the present exemplary embodiment, a mechanism is provided that prevents one device whose operation state is to be managed from being viewed as if to be two devices from the user. More specifically, the mechanism allows the management apparatus in a system with an image processing apparatus and a control apparatus that is connected to the image processing apparatus and transmits print data both connected to a network to manage operation of the image processing apparatus without duplication.

Some exemplary embodiments of the present disclosure will be specifically described below with reference to drawings. Configurations described in the following exemplary embodiments are illustrative, and the present disclosure is not limited to the illustrated configurations.

<Configuration of Device Operation Management System>

Figure 1:
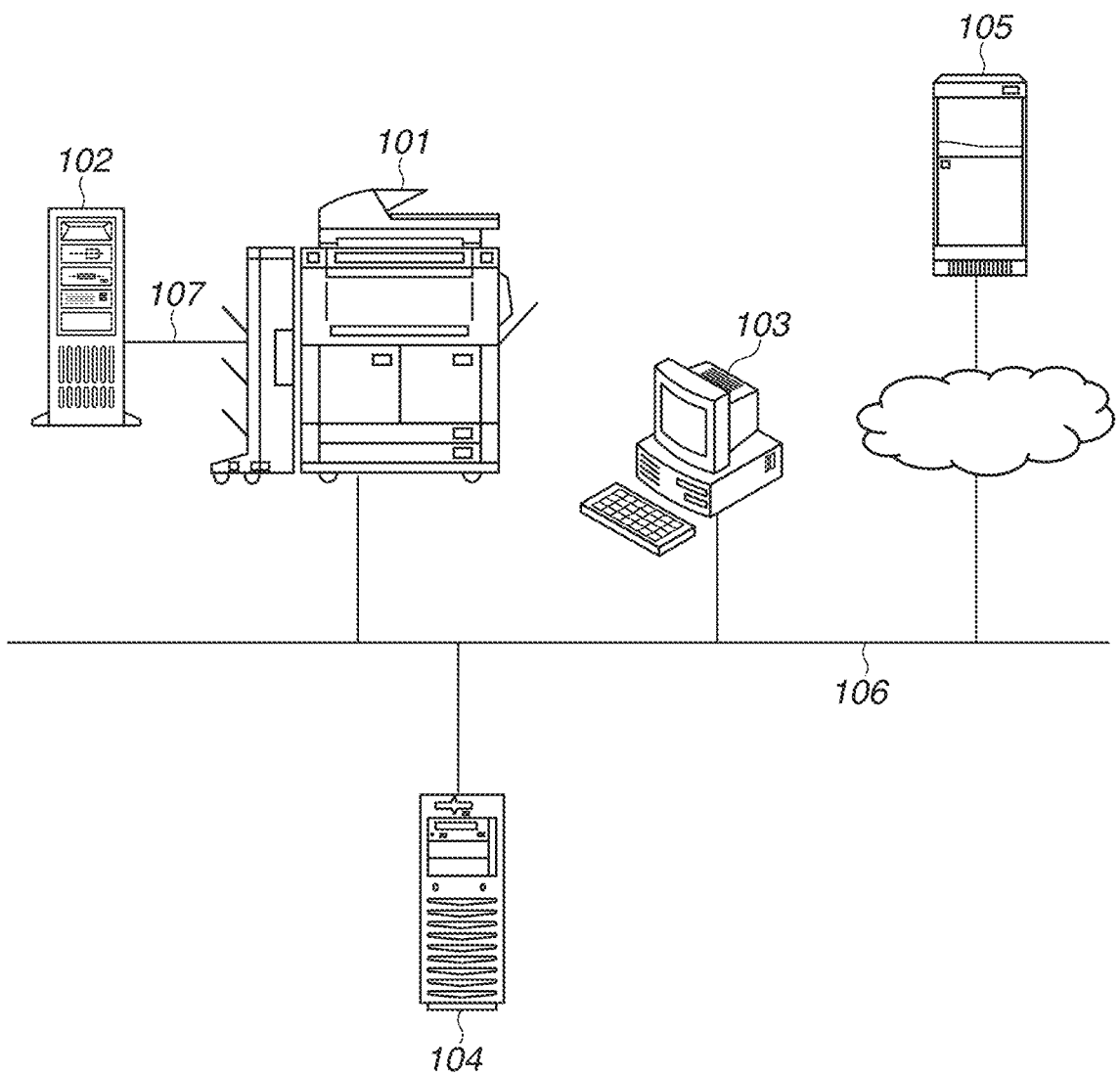
FIG. 1 illustrates an example of a connection environment of a device operation management system according to a present exemplary embodiment.

FIG. 1 illustrates an example of a connection environment of a device operation management system according to a first exemplary embodiment of the present disclosure.

As illustrated in FIG. 1, the device operation management system (hereinafter, referred to as "the system") according to the present exemplary embodiment includes an MFP 101 and a DFE 102. The system further includes a client personal computer (PC) 103, an information collection PC 104, and a device operation management apparatus 105.

The MFP 101, the DFE 102, the client PC 103, and the information collection PC 104 are communicably connected to one another through a network 106.

Further, the DFE 102 and the MFP 101 are connected via an internal interface 107, which transfers images at high speed.

In the system, the client PC 103 transmits a print job through the network 106 to the DFE 102. The DFE 102 sequentially performs rasterizing processing on the print job received from the client PC 103 through the network 106, and transfers rasterized image data (also referred to as print data) to the MFP 101 through the internal interface 107. The MFP 101 performs suitable processing on the rasterized image data received from the DFE 102 through the internal interface 107, and performs printing and output on an actual sheet.

Figure 2:
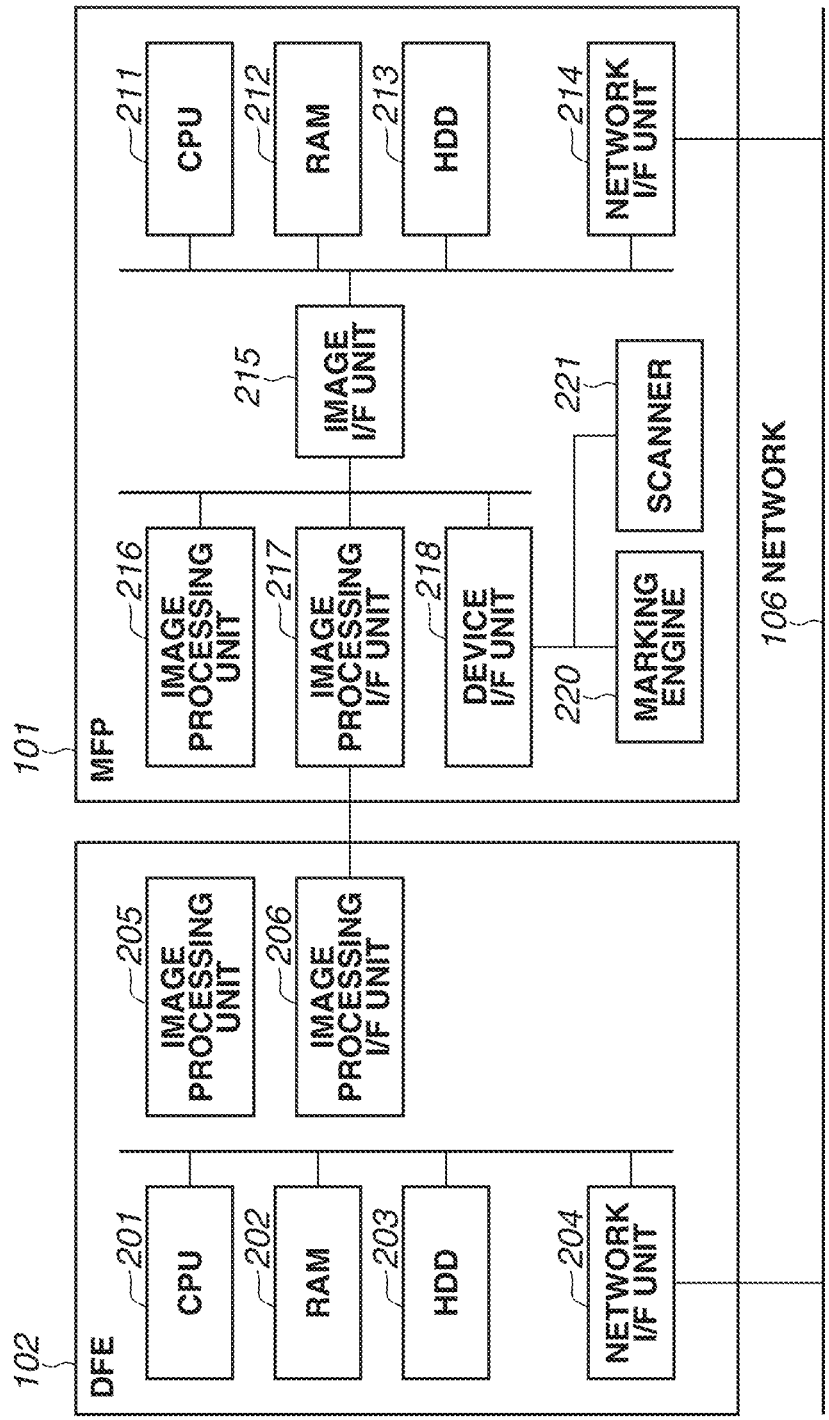
FIG. 2 is a block diagram illustrating an example of a hardware configuration of a multifunction printer (MFP) and a digital front end controller (DFE).

Print jobs for offices can be transmitted from the client PC 103 to the MFP 101 through the network 106. The MFP 101 sequentially processes the print job received from the client PC 103, and performs printing and output on an actual sheet by a marking engine 220 (FIG. 2). Further, the MFP 101 can perform copy (copy job) with a connected scanner, and transmit a scan result to the client PC 103 (transmission job). The MFP 101 can print facsimile (FAX) reception data (FAX job) received through a telephone line (not illustrated).

The DFE 102 communicates with the MFP 101, and acquires and manages the serial number, product name information, etc. of the MFP 101. Further, the DFE 102 manages execution information on a job carried out by itself.

The information collection PC 104 is an information processing apparatus that searches for a device connected to the network 106 and registers a found device in a device list described below. The information collection PC 104 collects information on devices registered in the device list, through the network 106, and stores the collected information. Further, the information collection PC 104 transmits the collected and stored information to the device operation management apparatus 105.

The device operation management apparatus 105 displays information that is browsed by a print administrator in order to manage productivity and an operation rate of a plurality of MFPs. The device operation management apparatus 105 includes units to receive information from the information collection PC 104, to store the information, and to prepare display of a device operation state. The device operation management apparatus 105 may consist of one computer or a plurality of computers. The device operation management apparatus 105 may be provided in, for example, a cloud service.

The client PC 103 accesses the device operation management apparatus 105, and displays the information prepared for display by the device operation management apparatus 105. This enables the print administrator to check the operation state of a device of interest. The client PC 103 is any of various kinds of information processing apparatuses such as a personal computer, a tablet terminal, and a smartphone.

<Device Configuration of MFP 101 and DFE 102>

FIG. 2 is a block diagram illustrating an example of a hardware configuration of the MFP 101 and the DFE 102.

The MFP 101 includes a controller unit including a central processing unit (CPU) 211, a random access memory (RAM) 212, and a hard disk drive (HDD) 213. The MFP 101 further includes the marking engine 220, a scanner 221, an image processing unit 216, an image processing interface (I/F) unit 217, a device I/F unit 218, and a network I/F unit 214. Various kinds of programs are stored in the HDD 213, are read out to the RAM 212, and are run by the CPU 211 as appropriate.

The DFE 102 includes a controller unit including a CPU 201, a RAM 202, and an HDD 203. The DFE 102 further includes an image processing unit 205, an image processing I/F unit 206, and a network I/F unit 204. Various kinds of programs are stored in the HDD 203, are read out to the RAM 202, and are run by the CPU 201 as appropriate. The DFE 102 functions as a control apparatus providing functions to the MFP 101.

The system with the MFP 101 and the DFE 102 connected to each other as described above is regarded as a system with a plurality of control units connected to an operation apparatus.

In some embodiments, the MFP 101 and the DFE 102 each include a display/operation device (not illustrated) as appropriate.

<Device Configuration of Information Collection PC 104 and Device Operation Management Apparatus 105>

Figure 3:
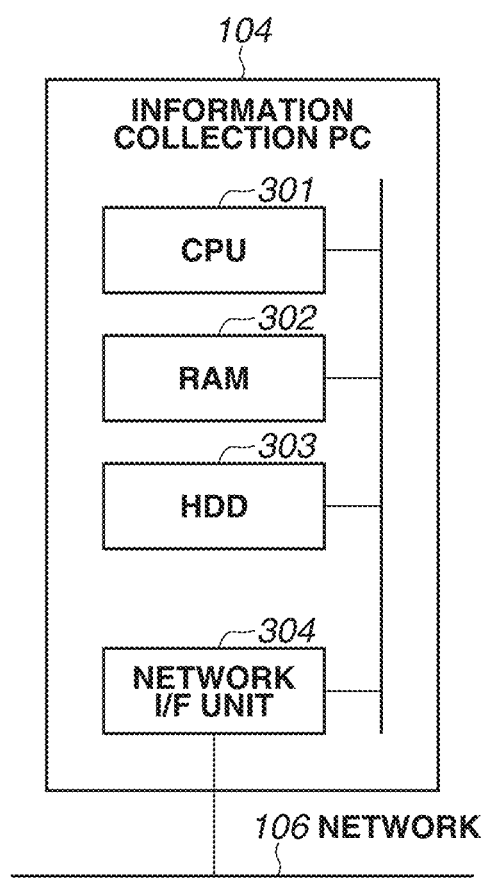
FIG. 3 is a block diagram illustrating an example of a hardware configuration of an information collection personal computer (PC).

FIG. 3 is a block diagram illustrating an example of a hardware configuration of the information collection PC.

The information collection PC 104 includes a CPU 301, a RAM 302, an HDD 303, and a network I/F unit 304. Pieces of hardware such as the CPU 301, the RAM 302, and the HDD 303 constitute a so-called computer. Various kinds of programs are stored in the HDD 303, are read out to the RAM 302, and are controlled and run by the CPU 301 as appropriate.

Figure 4:
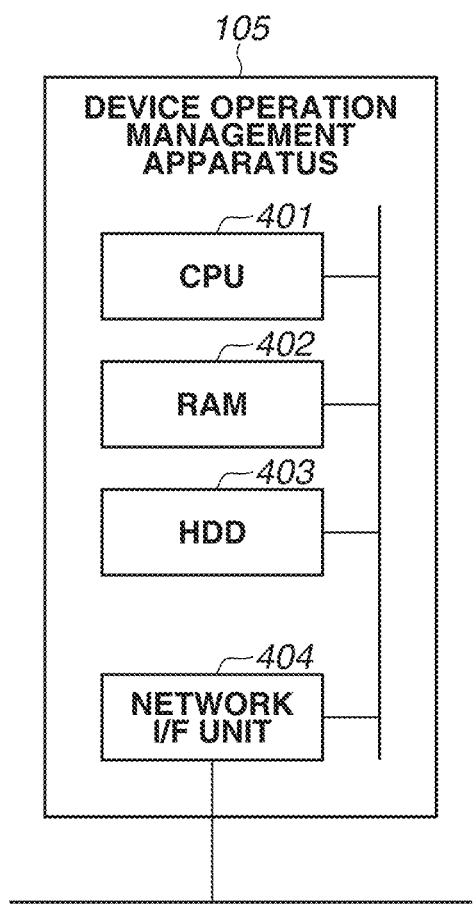
FIG. 4 is a block diagram illustrating an example of a hardware configuration of a device operation management apparatus.

FIG. 4 is a block diagram illustrating an example of a hardware configuration of the device operation management apparatus 105.

The device operation management apparatus 105 includes a CPU 401, a RAM 402, an HDD 403, and a network I/F unit 404. Pieces of hardware such as the CPU 401, the RAM 402, and the HDD 403 constitute a so-called computer. Various kinds of programs are stored in the HDD 403 and the like, are read out to the RAM 402, and are controlled and run by the CPU 401 as appropriate.

<Processing Function Configuration of Information Collection PC 104>

Figure 5:
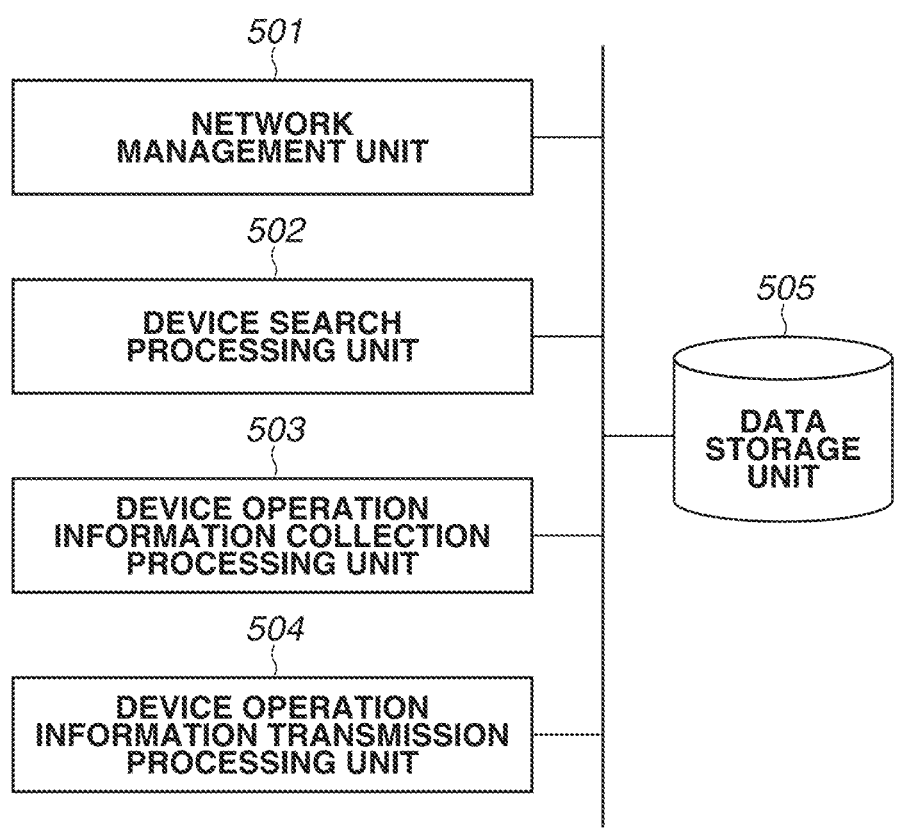
FIG. 5 is a block diagram illustrating an example of a processing function configuration of the information collection PC.

FIG. 5 is a block diagram illustrating an example of a processing function configuration of the information collection PC 104.

Software modules of the information collection PC 104 illustrated in FIG. 5 are stored in the HDD 303 of the information collection PC 104, and function by being read out to the RAM 302 and controlled and run by the CPU 301 as appropriate. In the information collection PC 104, one CPU 302 performs processing illustrated in a flowchart described below; however, other modes may be adopted. For example, the information collection PC 104 can cause a plurality of processors and memories to cooperate with one another to perform the processing illustrated in the flowchart described below. Further, part of processing such as transmission and reception of data is performed in cooperation with a hardware circuit such as a communication interface.

A network management unit 501 uses the network I/F 304 to communicate with devices connected to the network 106, for example, the DFE 102, the MFP 101, and the client PC 103, and the device operation management apparatus 105 on the cloud, through the network.

A device search processing unit 502 is a software module searching for a device connected to the network 106. The device search processing unit 502 is run, for example, periodically, at the time of new setting, or at the time of adding a new device, and registers an operation management target device on the network in a device list described below.

A device operation information collection processing unit 503 is a software module collecting operation information from the operation management target device registered in the device list. The collected operation information is stored in a data storage unit 505. The data storage unit 505 stores the information in the HDD 303 of the information collection PC 104. In some embodiments, the data storage unit 505 stores the information in a predetermined storage area such as the RAM 302 or an external storage area.

A device operation information transmission processing unit 504 is a software module periodically transmitting device operation information that is collected by the device operation information collection processing unit 503 and is stored in the data storage unit 505, to the device operation management apparatus 105.

<Processing Function Configuration of Device Operation Management Apparatus 105>

Figure 6:
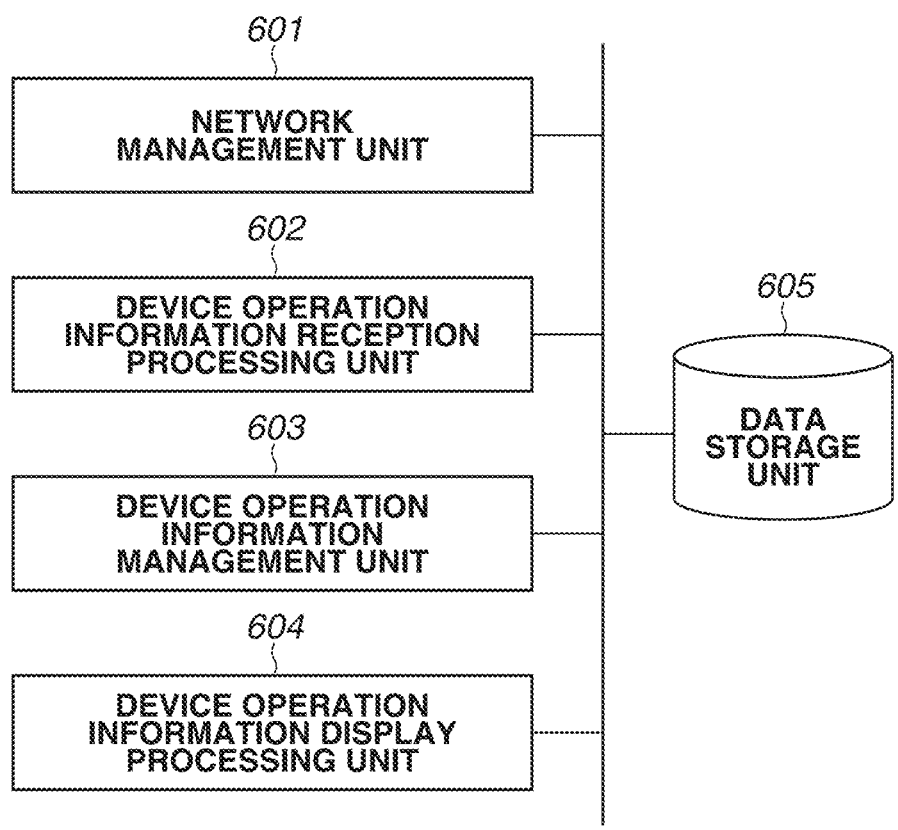
FIG. 6 is a block diagram illustrating an example of a processing function configuration of the device operation management apparatus.

FIG. 6 is a block diagram illustrating an example of a processing function configuration of the device operation management apparatus 105.

Software modules of the device operation management apparatus 105 illustrated in FIG. 6 are stored in the HDD 403 of the device operation management apparatus 105, and function by being read out to the RAM 402 and controlled and run by the CPU 401 as appropriate. In the device operation management apparatus 105, one CPU 401 performs processing illustrated in a flowchart described below; however, other modes may be adopted. For example, the device operation management apparatus 105 can cause a plurality of processors and memories to cooperate with one another to perform the processing in the flowchart described below. Further, part of processing such as transmission and reception of data is performed in cooperation with a hardware circuit such as a communication interface.

A network management unit 601 uses the network I/F unit 104 to communicate with the information collection PC 104, the client PC 103, and a device on the Internet.

An operation information reception processing unit 602 is a software module receiving operation information transmitted from the information collection PC 104.

A device operation information management unit 603 is a software module that appropriately manages device operation information received by the operation information reception processing unit 602 and stores the device operation information in a data storage unit 605. The data storage unit 605 stores the information in the HDD 403 of the device operation management apparatus 105. In some embodiments, the data storage unit 605 stores the information in a predetermined storage area such as the RAM 402 or an external storage area.

A device operation information display processing unit 604 is a software module displaying device operation information managed by the device operation information management unit 603, on the client PC 103 or the device on the Internet. The device operation information display processing unit 604 generates information representing a device operation state (prepares display screen representing device operation state) based on device operation information managed by the device operation information management unit 603.

Figure 7A:
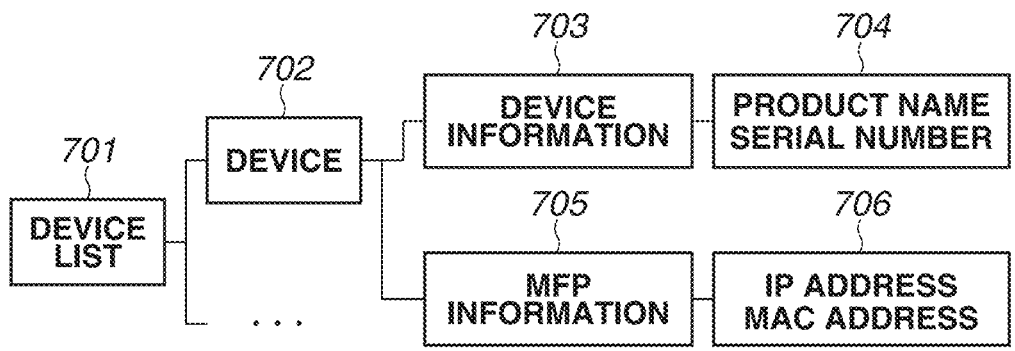
FIGS. 7A to 7C are diagrams illustrating data structures of a device list, transmission operation information, and operation information according to a first exemplary embodiment.

FIG. 7A is a diagram illustrating an example of a data structure of a device list managed by the device operation information management unit 603 according to the first exemplary embodiment.

The device list includes information on a plurality of devices to be managed (hereinafter, "devices 702"). Each of the devices 702 has device information 703 and MFP information 705. The device information 703 includes information 704 such as the product name and the serial number of the corresponding device. The MFP information 705 includes information 706 such as the internet protocol (IP) address and the media access control (MAC) address of the corresponding MFP.

Figure 7B:
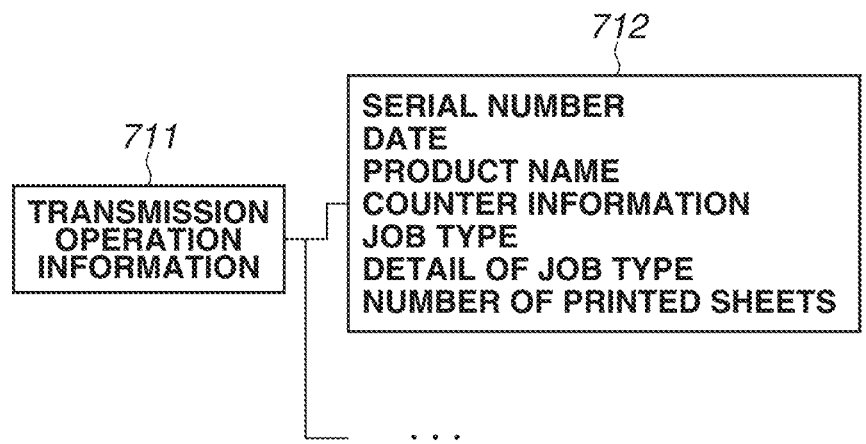

FIG. 7B is a diagram illustrating an example of a data structure of transmission operation information 711 transmitted from the MFP 101 to the information collection PC 104.

The transmission operation information 711 includes, for each job, information 712 such as a serial number, a date, a product name, counter information, a job type, detail of the job type, information on the number of jobs after previous transmission, and information on the number of printed sheets.

Figure 7C:
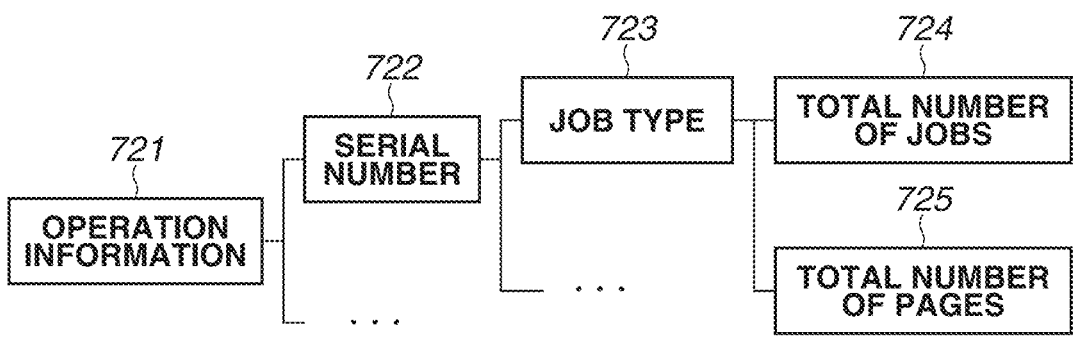

FIG. 7C is a diagram illustrating an example of a data structure of operation information managed by the device operation information management unit 603 according to the first exemplary embodiment.

Operation information 721 is managed for each device serial number 722, and includes the total number of jobs 724 and the total number of pages 725 for each job type 723. Examples of the job type 723 include print job, copy job, facsimile job, and scan job.

FIG. 8 is a flowchart illustrating an example of processing performed by the device search processing unit 502 in the information collection PC 104 according to the first exemplary embodiment, to search for a device on the network and to register the found device in a device list. The CPU 301 of the information collection PC 104 loads programs stored in the HDD 303 or other storages to the RAM 302 and run the programs as appropriate to perform the processing of the flowchart.

In step S801, the device search processing unit 502 searches for a device connected to the network I/F unit 304 through the network 106. For example, the device search processing unit 502 broadcasts search packets. In place of broadcasting, multicasting may be performed.

Next, in step S802, the device search processing unit 502 acquires device information on a device that has responded to in the search in step S801, and stores the device information in the memory 302 or the HDD 303 through the data storage unit 505.

Next, in step S803, the device search processing unit 502 determines whether the device information has been registered in the device list. If the device information has been registered (YES in step S803), the processing of the flowchart ends.

Otherwise (NO in step S803), the processing proceeds to step S804.

In step S804, the device search processing unit 502 determines whether the device information acquired in step S802 is device information on the MFP. If the device information acquired in step S802 is not device information on the MFP (NO in step S804), the processing of the flowchart ends without adding the device information acquired in step S802 to the device list.

If it is determined that the device information acquired in step S802 is device information on the MFP (YES in step S804), the processing proceeds to step S805.

In step S805, the device search processing unit 502 adds the device information acquired in step S802 to the device list. More specifically, the device search processing unit 502 adds the pieces of information 702 to 706 to the device list 701, which has the structure as illustrated in FIG. 7A, based on the device information acquired in step S802. After the processing in step S805, the processing of the flowchart ends.

The device list registered in the above-described manner is stored in the data storage unit 505 and is transmitted to the device operation management apparatus 105, and is managed by the device operation information management unit 603 of the device operation management apparatus 105. Further, the device operation information collection processing unit 503 of the information collection PC 104 collects the operation information as illustrated in FIG. 7B from the device registered in the above-described device list, and stores the collected operation information in the data storage unit 505. Further, the device operation information transmission processing unit 504 transmits the operation information stored in the data storage unit 505 to the device operation management apparatus 105. The device operation information management unit 603 of the device operation management apparatus 105 manages the operation information on the MFP 101 (including serial number of MFP 101) as illustrated in FIG. 7B received from the information collection PC 104, with the data structure as illustrated in FIG. 7C, based on the serial number.

According to the first exemplary embodiment, in the print system with the MFP and the DFE both connected to a network, the above-described mechanism allows the device operation management apparatus to manage the operation state without duplication of the same MFP. This prevents some pieces of operation information on a single MFP from being displayed as if to be respective pieces of operation information on different MFPs.

A second exemplary embodiment will be described. In the above-described first exemplary embodiment, the configuration has been described that registers the found MFP in the device list without registering the DFE connected to the MFP in the device list to manage the operation information without duplication. Some users have demand to manage operation information on the DFE in detail. The following is a description of an exemplary embodiment satisfying the demand.

Figure 9:
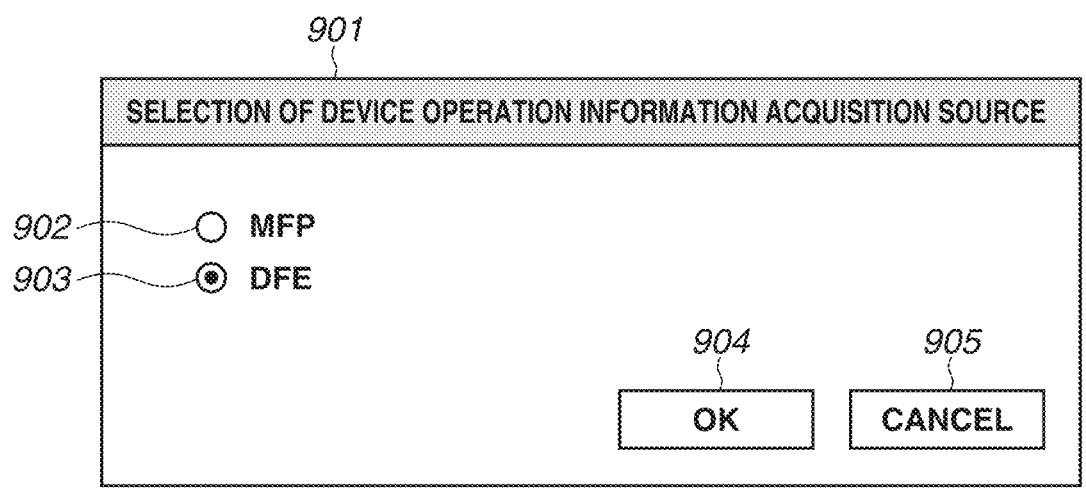
FIG. 9 illustrates an example of a setting screen for an information collection PC according to a second exemplary embodiment.

FIG. 9 illustrates an example of a setting screen for the information collection PC 104 according to the second exemplary embodiment.

The screen is displayed on a display unit of the client PC 103 in response to access of the client PC 103 to the information collection PC 104. A user such as a print administrator performs instructions on the screen.

A setting screen 901 is a screen that allows the user to previously select and set an acquisition source of device operation information. The user selects an acquisition source of device operation information with a radio button 902 or 903. To acquire device operation information from the MFP 101, the user selects the radio button 902. Otherwise, to acquire device operation information from the DFE 102, the user selects the radio button 903. A selection of one of the radio buttons 902 and 903 and then a press of an "OK" button 904 enables the setting in the setting screen 901, and then the setting screen 901 is closed. The setting is stored in the HDD 303 of the information collection PC 104. A press of a "cancel" button 905 disables the setting in the setting screen 901, and the setting screen 901 is closed.

In the second exemplary embodiment, the "MFP information" 705 in FIG. 7A is replaced with "device information acquisition source information". In addition, if the DFE 102 is set as the device operation information acquisition source in the setting screen 901, transmission operation information transmitted from the DFE 102 to the information collection PC 104 includes the serial number of the MFP 101, which is acquired from the MFP 101 and is managed by the DFE 102.

Figure 10:
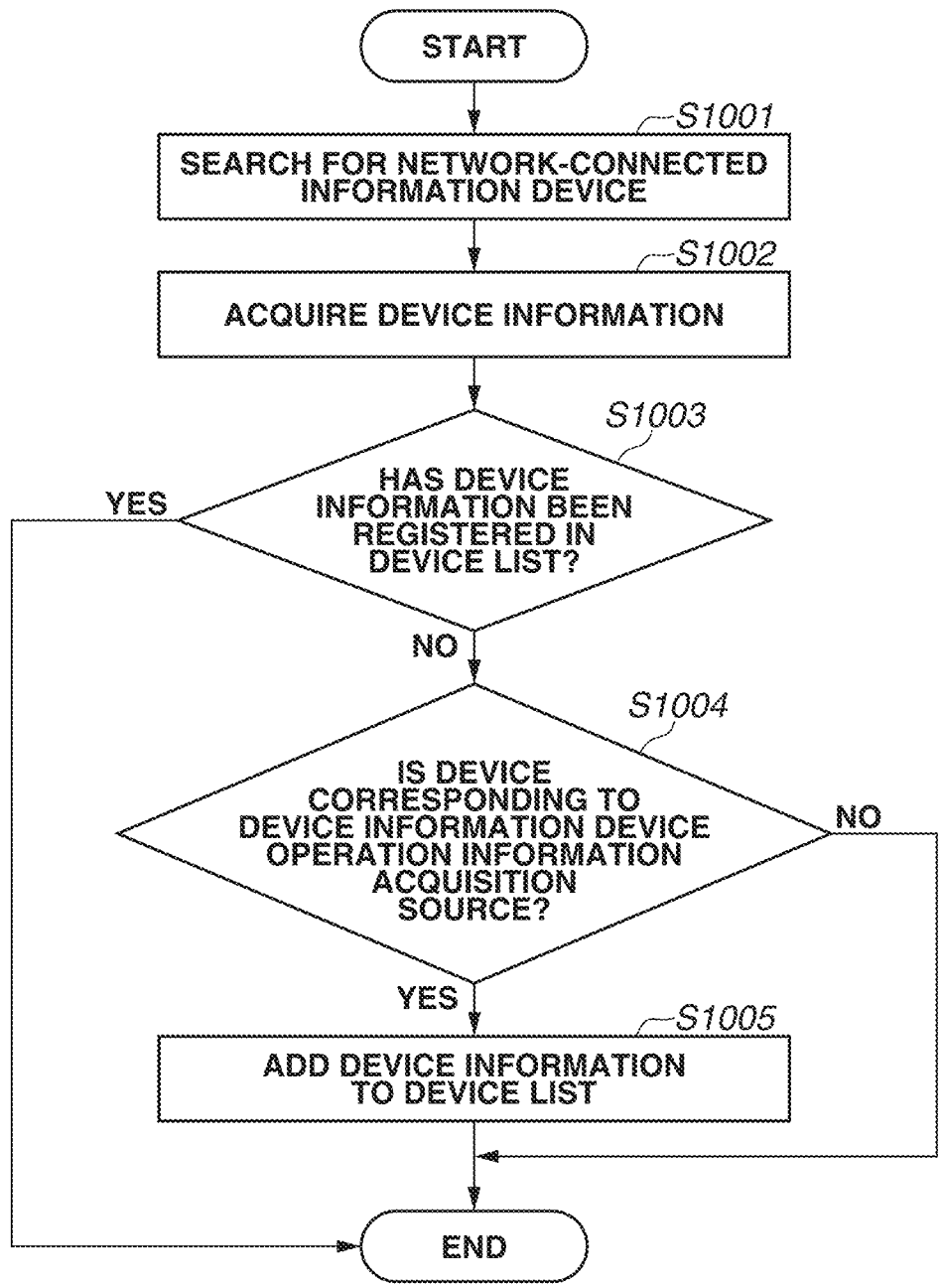
FIG. 10 is a flowchart illustrating an example of processing performed by the information collection PC according to the second exemplary embodiment.

FIG. 10 is a flowchart illustrating an example of processing performed by the device search processing unit 502 in the information collection PC 104 according to the second exemplary embodiment, to search for a device on the network and to register the found device in the device list. The CPU 301 of the information collection PC 104 loads programs stored in the HDD 303 or other storages to the RAM 302 and runs the programs as appropriate to perform the processing in the flowchart.

The processing in steps S1001 to S1003 is the same as the processing in steps S801 to S803 in FIG. 8. Thus, the description of the processing will be omitted.

In step S1004, the device search processing unit 502 determines whether the device information acquired in step S1002 is device information on the MFP or device information on the DFE, and determines whether the device corresponding to the device information acquired in step S1002 is the device operation information acquisition source set in the screen 901 of FIG. 9. If the device corresponding to the device information acquired in step S1002 is not the device operation information acquisition source (NO in step S1004), the processing of the flowchart ends without adding the device information acquired in step S1002 in the device list.

On the other hand, if it is determined that the device corresponding to the device information acquired in step S1002 is the device operation information acquisition source (YES in step S1004), the processing proceeds to step S1005.

In step S1005, the device search processing unit 502 adds the device information acquired in step S1002 in the device list. More specifically, the device search processing unit 502 adds the pieces of information 702 to 706 to the device list 701 having the above-described structure, based on the device information acquired in step S1002. After the processing in step S1005, the processing of the flowchart ends.

The device list registered in the above-described manner is stored in the data storage unit 505 and is transmitted to the device operation management apparatus 105, and is managed by the device operation information management unit 603 of the device operation management apparatus 105. Further, the device operation information collection processing unit 503 of the information collection PC 104 collects operation information from the device registered in the above-described device list, and the device operation information transmission processing unit 504 transmits the collected operation information to the device operation management apparatus 105. The device operation information management unit 603 of the device operation management apparatus 105 manages operation information on the MFP 101 or the DFE 102 (including serial number of MFP 101)

received from the information collection PC 104, with the data structure as illustrated in FIG. 7C, based on the serial number.

The described-above mechanism according to the second exemplary embodiment allows operation information to be managed without duplication of the same MFP, by using operation information acquired from the device selected and set as the device information acquisition source. A selection and set of a DFE as a device information acquisition source by a print administrator allows detailed management of operation information on the DFE.

A third exemplary embodiment will be described. In the above-described first and second exemplary embodiments, if a device on the network is searched for and the MFP and the DFE connected to the MFP are found, operation information is collected from one of the MFP and the DFE. Further, the device operation management apparatus 105 manages device operation information using the information collected in the above-described manner. In other words, the configuration has been described that manages the operation information without duplication of the same MFP using the operation information collected from one of the MFP and the DFE. On the other hand, the DFE and the MFP run jobs different from each other. As a result, users who want to analyze the number of printed sheets and the number of jobs in detail have demand to integrally manage operation information on the MFP and operation information on the DFE. In the present exemplary embodiment, a configuration will be described that integrally manages operation information on the MFP and operation information on the DFE. In the present exemplary embodiment, the information collection PC 104 collects operation information from both the MFP 101 and the DFE 102.

Figure 11:
FIG. 11 illustrates an example of an operation state screen according to a third exemplary embodiment.

FIG. 11 illustrates an example of an operation state screen displaying, on the client PC 103, display content prepared by the device operation information display processing unit 604 according to the third exemplary embodiment.

In an operation state screen 1101, a device list is displayed in a device list 1102 on the left of the screen. The MFP 101 and the DFE 102 are recognized as two different devices on the network, but the information is displayed as a single device in the device list. In the example in FIG. 11, a device "AB-Cx00" displayed at the head of the device list 1102 is a device including the MFP 101 and the DFE 102, which is displayed as a single device. The MFP 101 and the DFE 102 are connected via the internal interface 107, and each transmit transmission operation information including the same serial number to the information collection PC 104.

A consumable information display displays the remaining amounts of consumables.

Figure 12:
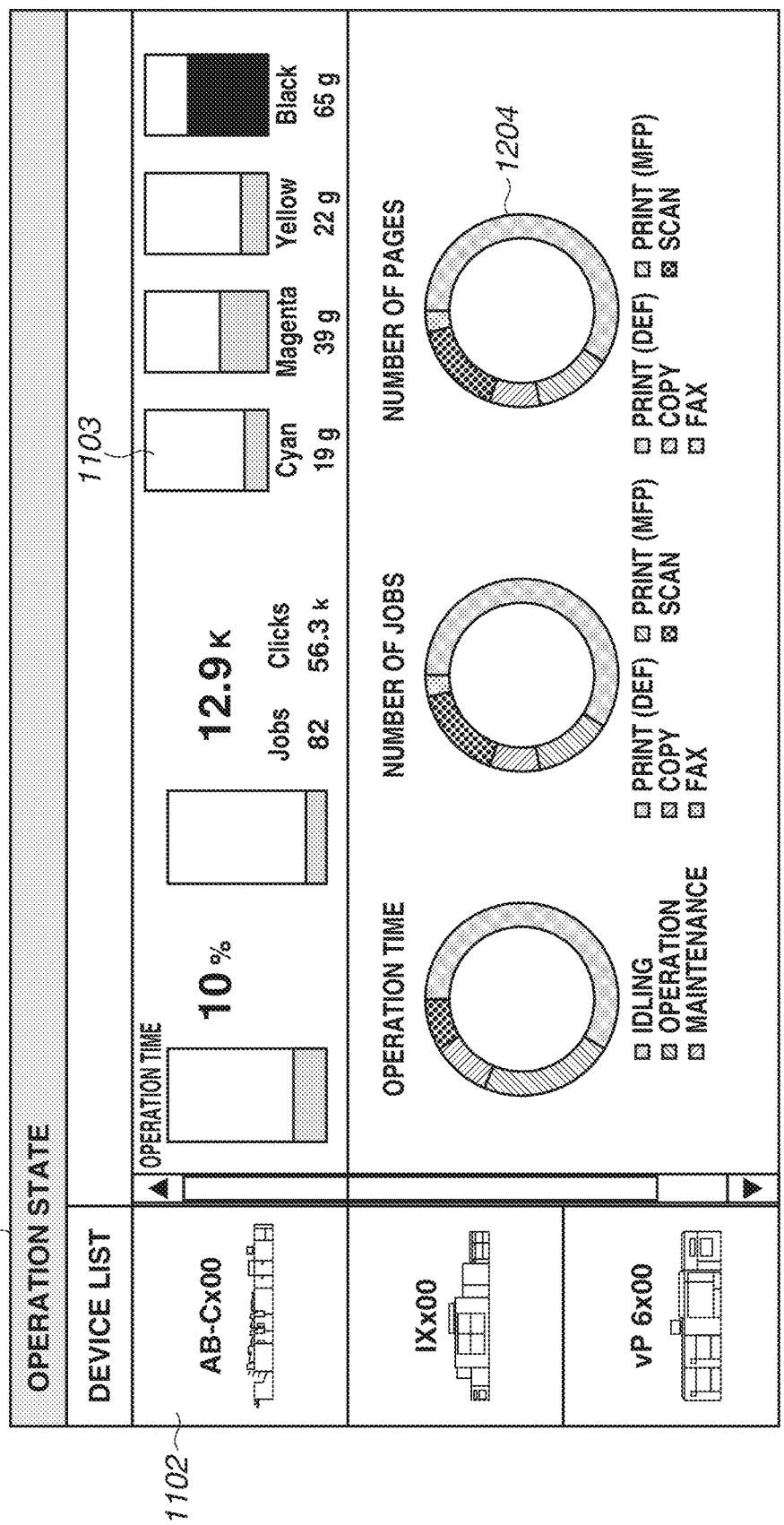
FIG. 12 illustrates a display example of detailed information on a device according to the third exemplary embodiment.

When any of the devices is selected from the device list displayed in the device list 1102 and an instruction is issued (e.g., double click is performed), for example, detailed information 1204 in FIG. 12 on the selected device is displayed.

FIG. 12 illustrates a display example of the detailed information on the device according to the third exemplary embodiment.

In the detailed information 1204, the total number of print jobs and the total number of pages are displayed as combined (integrated) information on the jobs run by both the MFP 101 and the DFE 102 constituting the device selected in the device list 1102.

Figure 13A:
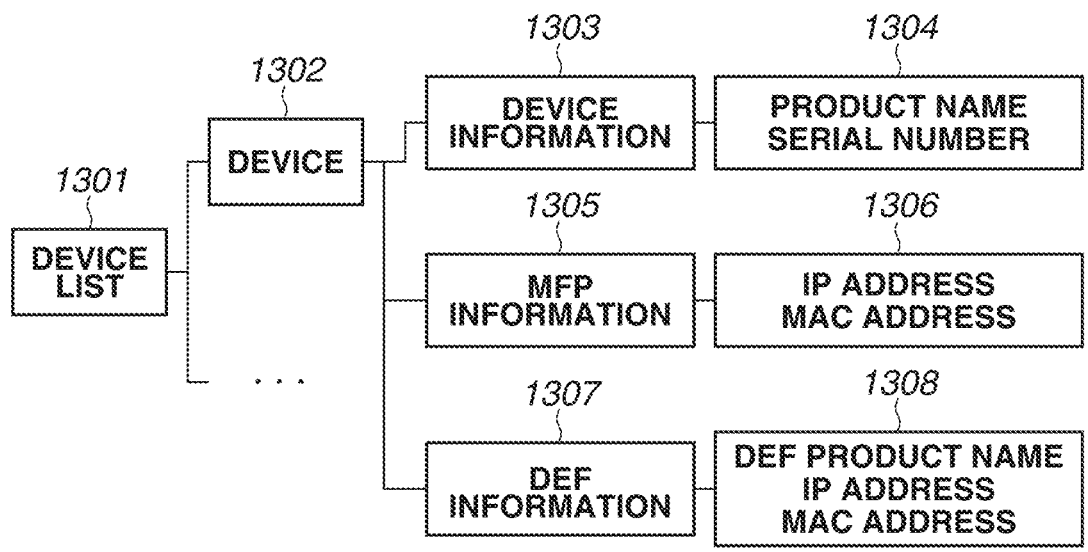
FIGS. 13A and 13B are diagrams illustrating data structures of the device list and the transmission operation information according to the third exemplary embodiment.
Figure 13B:
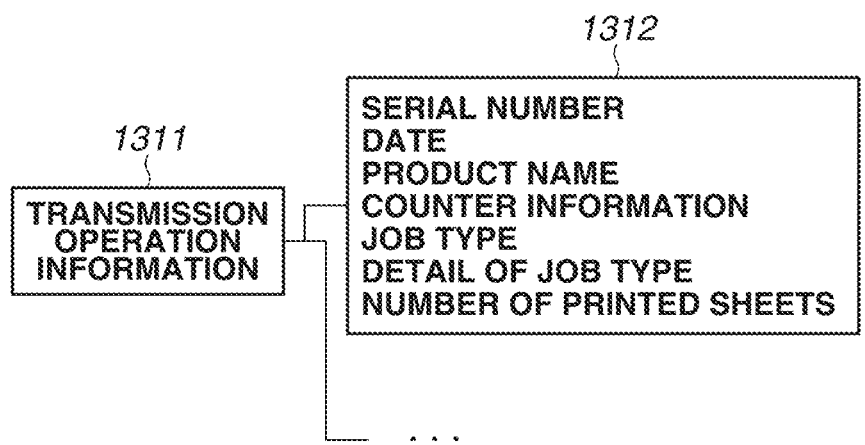

FIGS. 13A to 13C illustrate examples of data structures of the device list, transmission operation information, and operation information according to the third exemplary embodiment.

FIG. 13A illustrates an example of the data structure of the device list managed by the device operation information management unit 603.

A device list 1301 includes information on a plurality of devices (hereinafter, "devices 1302").

Each of the devices 1302 has device information 1303, MFP information 1305, and DFE information 1307.

The device information 1303 includes device information 1304 common to the MFP and the DFE, for example, a serial number and an engine name acquired from the MFP or the DFE. As counter information, more accurate information acquired from the MFP 101 may be used. The MFP information 1305 includes MFP unique information 1306 such as the IP address and the MAC address of the corresponding MFP. Likewise, the DFE information 1307 includes DFE unique information 1308 such as the DFE product name, the IP address, and the MAC address of the corresponding DFE.

The device search processing unit 502 according to the third exemplary embodiment searches for a device on the network 106 (similar to step S801 in FIG. 8), acquires device information on the device that has responded to (similar to step S802), and stores the acquired device information in the memory 302 or the HDD 303 through the data storage unit 505. Further, if the device information has not been registered in the device list (similar to step S803), the device search processing unit 502 adds the information 1302 and subsequent information in the device list 1301 having the structure as illustrated in FIG. 13A, based on the acquired device information. At this time, if the acquired device information is device information on the MFP, the pieces of MFP information 1305 and 1306 are added. If the acquired device information is device information on the DFE, the pieces of DFE information 1307 and 1308 are added.

The device list registered in the above-described manner is stored in the data storage unit 505 and is transmitted to the device operation management apparatus 105, and is managed by the device operation information management unit 603 of the device operation management apparatus 105. Further, the device operation information collection processing unit 503 of the information collection PC 104 collects operation information from the device registered in the above-described device list, and the device operation information transmission processing unit 504 transmits the collected operation information to the device operation management apparatus 105.

FIG. 13B illustrates an example of data structure of transmission operation information 1311 transmitted from the MFP 101 or the DFE 102 to the information collection PC 104.

The transmission operation information 1311 includes, for each job, information 1312 such as a serial number, a date, a product name, counter information, a job type, detail of the job type, and information on the number of printed sheets. The serial number included in the transmission operation information transmitted from the DFE 102 to the information collection PC 104 corresponds to the serial number of the MFP 101 that is acquired from the MFP 101 and managed by the DFE 102.

FIG. 13C illustrates an example of a data structure of operation information managed by the device operation information management unit 603.

Operation information 1321 is managed for each of devices (hereinafter, "devices 1322"). Each of the devices 1322 has device information 1323, MFP operation information 1325, and DFE operation information 1336.

In the device information 1323, information 1324 such as a serial number, counter information, and consumable information is managed.

The MFP operation information 1325 is based on operation information collected from the MFP. The MFP operation information 1325 includes the total number of jobs and the total number of pages in each of job types such as a print job 1326, a copy job 1333, a scan job 1334, and a FAX job 1335.

The print job 1326 is specifically classified into a DFE job 1327 and an MFP job 1328. The DFE job 1327 is print job information input from the DFE 102 to the MFP 101. The DFE job 1327 includes the total number of jobs 1329 and the total number of pages 1330. Likewise, the MFP job 1328 includes the total number of jobs 1331 and the total number of pages 1332.

The DFE operation information 1336 is based on operation information collected from the DFE. The DFE operation information 1336 includes a print job 1337 and a scan job 1340.

The print job 1337 includes a portable document format (PDF) job 1338 and a PostScript job 1339 as detailed print types, and the total number of jobs and the total number of pages are managed for each job.

In the scan job 1334, the total number of jobs and the total number of pages are managed for each job as combined information on the scan job run by the MFP and the scan job run in response to an instruction from the DFE.

The DFE job 1327 and the print job 1337 each include at least information on update date and time (not illustrated).

The device operation information management unit 603 of the device operation management apparatus 105 associates operation information on the MFP 101 and operation information on the DFE 102 (including serial number of MFP) as illustrated in FIG. 13B received from the information collection PC 104, with a serial number, and manages the operation information with the data structure as illustrated in FIG. 13C. At this time, it is assumed that the serial number included in the operation information collected from the MFP 101 is the serial number included in the operation information collected from the DFE 102. In other words, the operation information on the MFP 101 and the operation information on the DFE 102 are managed in association with each other with the serial number as a key.

Figure 14A:
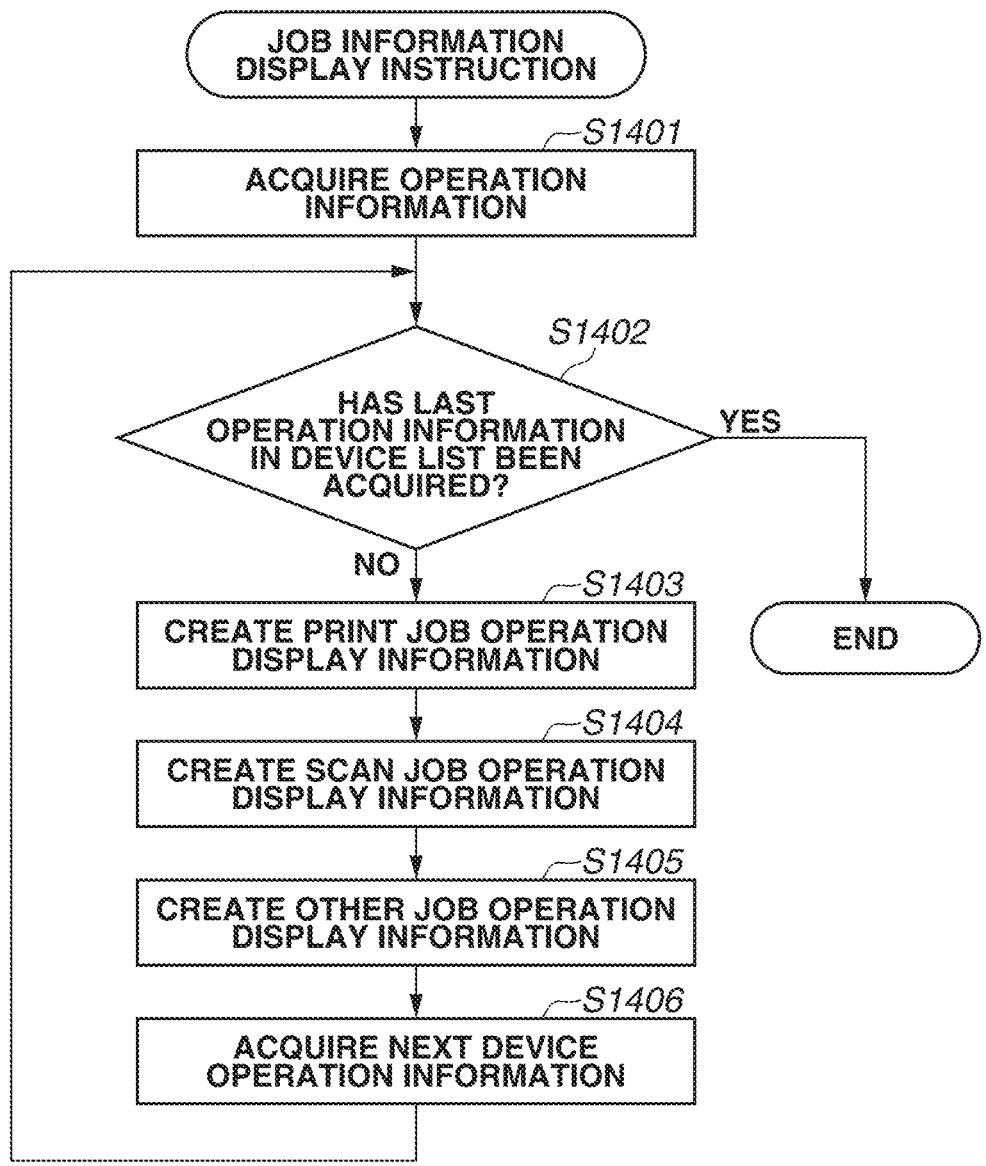
FIG. 14A is a flowchart illustrating an example of processing performed by a device operation management apparatus according to the third exemplary embodiment.

FIG. 14A and FIG. 14B are flowcharts illustrating an example of processing performed by the device operation information display processing unit 604 in the device operation management apparatus 105 according to the third exemplary embodiment, to create operation information to be displayed on the client PC 103. The CPU 401 of the device operation management apparatus 105 loads programs stored in the HDD 403 or other storages to the RAM 402 and runs the programs as appropriate to perform processing illustrated in FIG. 14A and FIG. 14B.

First, in step S1401, the device operation information display processing unit 604 requests the device operation information management unit 603 to acquire operation information (MFP operation information 1325 and DFE operation information 1336) on one of the devices in the device list. In the following, the device, the operation information on which is acquired, is referred to as a "corresponding device".

In step S1402, the device operation information display processing unit 604 checks whether the last operation information in the device list has been acquired. If the last operation information in the device list has not been acquired, namely, if the device, no operation information on which has been acquired, is present in the device list (NO in step S1402), the processing proceeds to step S1403. In this case, the operation information on the device requested in step S1401 is acquired.

In steps S1403 to S1405, the device operation information display processing unit 604 combines the MFP operation information 1325 and the DFE operation information 1336 acquired in step S1401, to create display information. Each of the steps will be described.

In step S1403, the device operation information display processing unit 604 creates print job operation display information on the corresponding device with the operation information acquired in the step S1401. The detail of the processing will be described with reference to FIG. 14B.

Next, in step S1404, the device operation information display processing unit 604 creates scan job operation display information on the corresponding device with the operation information acquired in step S1401.

Next, in step S1405, the device operation information display processing unit 604 creates operation display information on other jobs such as the FAX job 1335 on the corresponding device with the operation information acquired in step S1401.

Next, in step S1406, the device operation information display processing unit 604 requests the device operation information management unit 603 to acquire operation information on the next device from the device list. Thereafter, the processing proceeds to step S1402.

If the last operation information in the device list has been already acquired, namely, if no information on the device, operation information on which is to be acquired, is present in the device list (YES in step S1402), the processing of the flowchart ends.

The operation display information created (prepared for display) by the device operation management apparatus 105 in the above-described manner is transmitted to the client PC 103 in response to a request from the client PC 103, and is displayed on the client PC 103.

FIG. 14B is a flowchart illustrating details of the processing to create the print job operation display information in step S1403 of FIG. 14A.

First, in step S1411, the device operation information display processing unit 604 checks whether the DFE job 1327 in the MFP operation information 1325 matches the print job 1337 in the DFE operation information 1336, through comparison. If the DFE job 1327 in the MFP operation information 1325 and the print job 1337 in the DFE operation information 1336 are equal in the total number of jobs and the total number of pages, it is determined that the DFE job 1327 in the MFP operation information 1325 matches the print job 1337 in the DFE operation information 1336.

If the DFE job 1327 in the MFP operation information 1325 matches the print job 1337 in the DFE operation information 1336 (YES in step S1411), the processing proceeds to step S1414.

In step S1414, the device operation information display processing unit 604 uses the information on the print job 1337 in the DFE operation information 1336. In this case, in next step S1415, the device operation information display processing unit 604 combines the MFP job 1328 in the MFP operation information 1325 and the print job 1337 in the DFE operation information 1336, to acquire print job total operation information on the device. Performing the processing makes it possible to integrate the result of the print job run by the single MFP with print results managed by the DFE without going through the DFE. For example, results of status print to print status information on the MFP and results of print jobs that have been directly received by the MFP from mobile terminals and performed can be correctly counted.

In contrast, if the DFE job 1327 in the MFP operation information 1325 does not match the print job 1337 in the DFE operation information 1336 (NO in step S1411), the processing proceeds to step S1412.

In step S1412, the device operation information display processing unit 604 compares the DFE job 1327 in the MFP operation information 125 and the print job 1337 in the DFE operation information 1336 in the time when the operation information was received from the device to determine which is the latest information. If the print job 1337 in the DFE operation information 1336 is newer (DFE in step S1412), the processing proceeds to step S1414.

In contrast, if the DFE job 1327 in the MFP operation information 1325 is newer (MFP in step S1412), the processing proceeds to step S1413.

In step S1413, the device operation information display processing unit 604 uses the information on the DFE job 1327 in the MFP operation information 1325. In this case, in next step S1415, the device operation information display processing unit 604 combines the MFP job 1328 in the MFP operation information 1325 and the DFE job 1327 in the MFP operation information 1325, to acquire print job total operation information on the device.

Next, in step S1416, the device operation information display processing unit 604 acquires detailed job information (information on PDF job 1338 and PostScript job 1339) in the print job 1337 in the DFE operation information 1336.

Next, in step S1417, the device operation information display processing unit 604 calculates the ratio of each job based on the print job total operation information acquired in step S1415 and the detailed job information acquired in step S1416, and creates information for display. At this time, a display screen is created so that the ratio of each job is displayed in descending order of the number of jobs. The detail display screen is created to add the ratio of the PDF job 1338 and the ratio of the PostScript job 1339. Further, the display screen is created to display the ratio of a job through the DFE and the ratio of a job processed by the MFP without going through the DFE, in the same job type.

After the processing in step S1417, the processing of the flowchart ends. As described above, the information duplicated between the operation information on the MFP 101 and the operation information on the DFE 102 is combined (integrated) using one of the pieces of operation information on the MFP 101 and on the DFE 102.

As described above, in the present exemplary embodiment, when the executed job type is displayed, the pieces of operation information on both the MFP and the DFE are combined and displayed. At this time, the number of copy jobs and the number of FAX jobs run by the MFP are acquired from the MFP operation information. In contrast, print jobs run by the DFE are acquired from the DFE operation information.

According to the third exemplary embodiment, in the print system with the MFP and the DFE both connected to a network, the above-mentioned mechanism allows the device operation management apparatus to manage operation information without duplication of the same MFP, and to appropriately and integrally manage distributed job information. This makes it possible to prevent operation information on a single MFP from being displayed as if to be respective pieces of operation information on different MFPs.

Since the DFE and the MFP run different jobs, detail analysis of the number of printed sheets and the number of jobs involves both the MFP operation information and the DFE operation information. In the present exemplary embodiment, both pieces of operation information are combined to create display information. This enables detailed analysis of the number of printed sheets and the number of jobs.

In the above-described example, the configuration has been described that, if information on the same job type is included in both the MFP operation information and the DFE operation information, like the print job, both pieces of the information are combined to acquire the total information on the job type. In some embodiments, whether to combine both pieces of the information on the same job type in the MFP operation information and in the DFE operation information to acquire the total information is switched by user setting.

Further, if information on the same page description language (PDL) type is included in both the MFP operation information and the DFE operation information, both pieces of information may be combined to acquire total information. Further, a display screen is created to display PDL types in descending order of the number of jobs. Furthermore, if detailed display is instructed, the ratio of jobs of each PDL type may be displayed.

The display may include the ratio of jobs through the DFE and the ratio of job run by the MFP without going through the DFE in a PDL type. Additionally, whether to combine both pieces of information on the same PDL type in MFP operation information and in DFE operation information may be switched by user setting.

The device operation information display processing unit 604 may include a plurality of applications, and whether to perform combination or operation information used for display may be different depending on the application. For example, a first application displays and controls an operation state based on a result of combining MFP operation information and DFE operation information. A second application displays and controls an operation state based on MFP operation information to manage a job run by the MFP without going through the DFE. Further, a third application displays and controls an operation information based on information on the DFE for management in units of a print job. The client PC 103 can display a desired operation state by accessing a uniform resource locator (URL) of the application of which the operation state is to be displayed.

In the above-described exemplary embodiments, the information collection PC 104 performs generation of a device list and collection and transmission of operation information. Alternatively, the MFP 101 or the DFE 102 may perform similar control. In other words, the MFP 101 or the DFE 102 may include the above-described functions of the information collection PC 104.

Further, collection control of operation information provided by the PC 104, integral management control of operation information, creation of a screen about the operation information, and provision of the screen to the client PC provided by the management apparatus 105 may be performed by one server or one cloud service.

In the print system with the MFP 101 and the DFE 102 both connected to a network, the mechanism allows the device operation management apparatus 105 to manage operation without duplication of the same MFP, and to integrally manage distributed job information.

In other words, the printing apparatus is not displayed with duplication, the states of jobs run by the MFP and the DFE separately can be displayed in combination, and additionally a network communication fee can be reduced. As a result, in the system with a plurality of control units all connected to an operation apparatus, the operation state of the operation apparatus can be appropriately managed.

According to the exemplary embodiments described above, in the system with the image processing apparatus and the control apparatus that is connected to the image processing apparatus and transmits print data to the image processing apparatus are both connected to a network, the management apparatus can manage operation without duplication of the image processing apparatus. This makes it possible to prevent pieces of operation information on a single MFP from being displayed as if to be respective pieces of operation information on different MFPs.

It goes without saying that the configurations and the details of the various kinds of data described above are not limited thereto, and various configurations and details are used depending on applications and purposes.

Although some exemplary embodiments are described above, embodiments of the present disclosure can be embodied as, for example, a system, an apparatus, a method, a program, or a storage medium. More specifically, embodiments of the present disclosure may be applied to a system including a plurality of devices or to an apparatus including one device.

Further, embodiments of the present disclosure include combinations of the above-described exemplary embodiments.

OTHER EXEMPLARY EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-065121, filed Apr. 7, 2021, which is hereby incorporated by reference herein in its entirety.

What is claimed is:

1. A method for an information processing apparatus, which communicates with an image processing apparatus and a control apparatus connected to the image processing apparatus and transmitting print data to the image processing apparatus, the method comprising:
    acquiring first operation information and second operation information from a data storage system, wherein the first operation information is based on first transmitted operation information from the image processing apparatus via a network, and wherein the second operation information is based on second transmitted operation information from the control apparatus via the network; and
    performing control to display device operation state information about one apparatus based on a total amount of one of first information that is information about a number of jobs through the control apparatus and included in the first operation information based on the first transmitted operation information including a specific identifier and second information that is information about a number of jobs through the control apparatus and included in the second operation information based on the second transmitted operation information including the specific identifier, and third information that is information about a number of jobs processed by the image processing apparatus without going through the control apparatus and included in the first operation information.

2. The method according to claim 1, further comprising using, in a case where a specific condition is satisfied, the second information without using the first information to display the device operating status information.

3. The method according to claim 2, further comprising, in a case where the specific condition is not satisfied, using the newer of the first information and the second information without using the older of the first information and the second information to display the device operating status information.

4. The method according to claim 1, further comprising outputting display data for displaying an operation state of the one apparatus.

5. The method according to claim 4, further comprising outputting the display data in response to a request from a client terminal,
    wherein the client terminal displays a screen representing the device operation state information based on the output display data.

6. The method according to claim 1, wherein the identifier is a serial number of the image processing apparatus.

7. The method according to claim 1, wherein the first transmitted operation information includes date and time, a product name, counter information, a job type, job type details, information on the number of jobs since a previous transmission, and information on the number of printed sheets.

8. The method according to claim 1, wherein the control apparatus is a Digital Front End (DFE) controller.

9. The method according to claim 1, further comprising managing the first transmitted operation information and the second transmitted operation information by serial number of each apparatus.

10. The method according to claim 1, wherein the control apparatus performs rasterizing processing on a received print job and transmits image data that has been rasterized to the image processing apparatus.

11. The method according to claim 1, further comprising transmitting a print job to the image processing apparatus or the control apparatus.

12. An information processing apparatus configured to communicate with an image processing apparatus and a control apparatus connected to the image processing apparatus and transmitting print data to the image processing apparatus, the information processing apparatus comprising:
one or more processors; and
at least one memory storing executable instructions, which when executed by the one or more processors, cause the information processing apparatus to perform operations comprising:
acquiring first operation information and second operation information from a data storage system, wherein the first operation information is based on first transmitted operation information from the image processing apparatus via a network, and wherein the second operation information is based on second transmitted operation information from the control apparatus via the network; and
performing control to display device operation state information about one apparatus based on a total amount of one of first information that is information about a number of jobs through the control apparatus and included in the first operation information based on the first transmitted operation information including a specific identifier and second information that is information about a number of jobs through the control apparatus and included in the second operation information based on the second transmitted operation information including the specific identifier, and third information that is information about a number of jobs processed by the image processing apparatus without going through the control apparatus and included in the first operation information.

13. A non-transitory computer-readable storage medium storing executable instructions, which when executed by one or more processors of an information processing apparatus configured to communicate with an image processing apparatus and a control apparatus connected to the image processing apparatus and transmitting print data to the image processing apparatus, cause the information processing apparatus to perform operations comprising:
acquiring first operation information and second operation information from a data storage system, wherein the first operation information is based on first transmitted operation information from the image processing apparatus via a network, and wherein the second operation information is based on second transmitted operation information from the control apparatus via the network; and
performing control to display device operation state information about one apparatus based on a total amount of one of first information that is information about a number of jobs through the control apparatus and included in the first operation information based on the first transmitted operation information including a specific identifier and second information that is information about a number of jobs through the control apparatus and included in the second operation information based on the second transmitted operation information including the specific identifier, and third information that is information about a number of jobs processed by the image processing apparatus without going through the control apparatus and included in the first operation information.

14. The method according to claim 2, wherein the specific condition is that the first information matches the second information.

15. The method according to claim 2, wherein the specific condition is that a total number of jobs and a total number of pages that are indicated by the first information are equal to a total number of jobs and a total number of pages that are indicated by the second information.

16. The method according to claim 1, wherein the device operation state information indicates a ratio of jobs through the control apparatus and a ratio of jobs processed by the image processing apparatus without going through the control apparatus in a same job type.

* * * * *